United States Patent Office 3,654,330
Patented Apr. 4, 1972

3,654,330
TETRAACETONITRILOLITHIUM HEXAFLUORO-PHOSPHATE, TETRAACETONITRILOLITHIUM HEXAFLUOROARSENATE AND METHOD FOR THE PREPARATION THEREOF
Robert A. Wiesboeck, Atlanta, Ga., assignor to United States Steel Corporation
No Drawing. Continuation-in-part of application Ser. No. 829,111, May 29, 1969. This application May 1, 1970, Ser. No. 33,883
Int. Cl. C07f 9/66
U.S. Cl. 260—440           5 Claims

ABSTRACT OF THE DISCLOSURE

Tetraacetonitrilolithium hexafluorophosphate and tetraacetonitrilolithium hexafluoroarsenate, new compounds, and their preparation from lithium fluoride and $PF_5$ or previously prepared $LiPF_6$ with excess $CH_3CN$, and $LiAsF_6$ with excess $CH_3CN$, respectively, are disclosed. Tetraacetonitrilolithium hexafluorophosphate and tetraacetonitrilolithium hexafluoroarsenate are useful for the production of high purity exceptionally active $LiPF_6$ and $LiAsF_6$. The preparations of these new compositions are also disclosed.

This application is a continuation-in-part of our earlier copending application Ser. No. 829,111, dated May 29, 1969.

BACKGROUND OF THE INVENTION

This invention relates to lithium compounds and more particularly to improved lithium fluorophosphates and lithium hexafluoroarsenate.

The preparation of $LiPF_6$ is well known. It can be prepared by the action of bromine trifluoride on LiF and an excess of $P_2O_5$, but the product always contains LiF. When prepared by the action of $PF_5$ on LiF in anhydrous HF typical purities are 90–95% $LiPF_6$. Thus, conventional methods produce only impure $LiPF_6$. Further, the latter method requires the use of hazardous HF as a solvent and thus is not easily adaptable to commercial use. Further, the product may contain $LiHF_2$ as an impurity. This contains protons which are very detrimental for some uses such as for anhydrous batteries and the like. The purification is complicated due to the hygroscopicity and limited thermal stability of $LiPF_6$. Dissociation to $PF_5$ and LiF begins to take place at about 20° C., making purification and even removal of solvents difficult. Certain industrial applications such as in the electric current producing cell of U.S. Pat. 3,415,687, require $LiPF_6$ of highest purity, above about 99%, for best performance. However, conventional methods, as pointed out above, produce at best material of up to 95% $LiPF_6$. This material is not entirely suitable because the impurities can interfere with storage stability and solubility of the material. High purity $LiAsF_6$ is also useful as cell electrolyte as demonstrated in U.S. Pat. 3,415,687.

SUMMARY OF THE INVENTION

The invention provides tetraacetonitriololithium hexafluorophosphate, $Li(CH_3CN)_4PF_6$, and improved lithium hexafluorophosphate, $LiPF_6$, derived therefrom as well as methods for the preparation of these new compositions. $Li(CH_3CN)_4PF_6$ may be prepared in accordance with the invention by the action of excess $CH_3CN$ on LiF and $PF_5$ or by the action of excess $CH_3CN$ on even impure $LiPF_6$ at a temperature of about −40° C. to about 80° C., preferably 0–80° C. for $LiPF_6$ starting material and −10 to 20° C. for LiF and $PF_5$ starting material. The tetraacetonitrilolithium hexafluorophosphate can be prepared by several alternate routes beginning with the basic raw materials acetonitrile, phosphorus pentafluoride and lithium fluoride. The order of addition of these basic components is not critical to the success of the overall process, but it is strongly preferred to follow a certain order of addition for most economic and satisfactory operation of the process. Thus it is possible to combine the phosphorus pentafluoride with an excess of acetonitrile in the absence of any lithium fluoride. This, however, will cause the formation of a precipitate which is probably an adduct between phosphorus pentafluoride and acetonitrile which must then in turn be reacted in slurry form with lithium fluoride in order to cleave the adduct and form the desired compound. A better procedure is to first combine the lithium fluoride with an excess of acetonitrile since the lithium fluoride is more reactive than the acetonitrile toward the $PF_5$. Combination of lithium fluoride with excess acetonitrile, with subsequent addition of phosphorus pentafluoride, therefore, leads to a smooth and economical process. It is important, but not crucial, to the preferred process, therefore, that the reaction system always contain not more than a stoichiometric amount of the phosphorus pentafluoride. The $Li(CH_3CN)_4PF_6$ can be isolated from the excess $CH_3CN$ by removal of the later under vacuum. It can be isolated in very pure form of 99% or better by separating the solution thereof from any impurities and cooling the filtrate below about 0° under partial vacuum with withdrawal of $CH_3CN$ which is not chemically bound into the new compound.

Only acetonitrile acts on LiF and $PF_5$ or $LiPF_6$ to form the new compound, $Li(CH_3CN)_4PF_6$. The nearest homologue, propionitrile, as is illustrated by an example given below does not form a compound. Further, the $CH_3CN$ does not react with or dissolve LiF or other common impurities in conventionally prepared $LiPF_6$ so that the $Li(CH_3CN)_4PF_6$ can be easily separated from the impurities and used to produce pure $LiPF_6$. Therefore, the action of excess acetonitrile on LiF and $PF_5$ is unique and provides a useful new compound.

One use for $Li(CH_3CN)_4PF_6$ is the production of improved, high purity $LiPF_6$. When $Li(CH_3CN)_4PF_6$ is warmed above about 20° C. under a partial vacuum it dissociates into $LiPF_6$ and $CH_3CN$. If the warming and partial vacuum are continued until substantially all $CH_3CN$ has been evolved and separated, a $LiPF_6$ of exceptionally high purity and high surface area is obtained. $LiPF_6$ prepared by this process can be used where the highest purity $LiPF_6$ heretofore obtainable has not been entirely satisfactory, e.g. for the preparation of the electrolyte solution in organic solvents for use in anhydrous electric cells such as in U.S. Pat. 3,415,687.

Removal of the $CH_3CN$ in the solid state produces a highly surface active $LiPF_6$. The purity of the resulting $LiPF_6$ is above 99%, provided that the starting $Li(CH_3CN)_4PF_6$ is at least 99% pure and the $CH_3CN$ is completely removed.

The compound $Li(CH_3CN)_4PF_6$ is unique in that acetonitrile solutions of the compound can be heated at 80° C. for three hours without excessive decomposition whereas $LiPF_6$ decomposes at much lower temperatures of e.g. 30 to 40° C. to LiF and $PF_5$. It is pointed out, however, that the solubility of $Li(CH_3CN)_4PF_6$ in acetonitrile is strongly temperature dependent. A saturated solution contains 82 g./100 ml. at 60° C. and 11 g./100 ml. at 0° C. Excess $CH_3CN$ may be removed in any suitable manner but vacuum evaporation at −10° C. to 0° C. is preferred.

The pure crystals of $Li(CH_3CN)_4PF_6$ melt at 65 to 66° C. without decomposition. By contrast $LiPF_6$ exhibits a $PF_5$ equilibrium pressure of 60 mm. Hg at 65° C. There is no dissociation of $Li(CH_3CN)_4PF_6$ to LiF and $PF_5$ until all of the $CH_3CN$ has been removed. In other words, when $Li(CH_3CN)_4PF_6$ is heated under partial vacuum all of the $CH_3CN$ is evolved before there is any decomposition of the $LiPF_6$.

Another use for $Li(CH_3CN)_4PF_6$ is as a polymerization catalyst for cyclic ethers or unsaturated hydrocarbons.

Tetraacetonitrilolithium hexafluoroarsenate may be prepared in accordance with the invention by the action of excess $CH_3CN$ on $LiAsF_6$ at a temperature of about —40 to 80° C., preferably 0–80° C. The formed $$Li(CH_3CN)_4AsF_6$$

can be isolated by removal of the excess $CH_3CN$ under vacuum or better by separating any undissolved impurities by filtration and cooling of the filtrate to about 0° C. The solubility of $Li(CH_3CN)_4AsF_6$ in acetonitrile is strongly temperature dependent. A saturated solution contains 155.5 g./100 ml. at 40° C. and 26.8 g./100 ml. at 2° C. The precipitated $Li(CH_3CN)_4AsF_6$ is freed from adhering, not chemically bound $CH_3CN$ under partial vacuum.

One use for $Li(CH_3CN)_4AsF_6$ is the production of high purity $LiAsF_6$. For this purpose, the $Li(CH_3CN)_4AsF_6$ is warmed to about 30° C. under a partial vacuum to liberate substantially all $CH_3CN$ leaving a $LiAsF_6$ of exceptionally high purity and high surface area.

The invention is further illustrated by the following examples.

EXAMPLE I

The preparation of $Li(CH_3CN)_4PF_6$

Phosphorus pentafluoride was introduced into a slurry of 23 g. of LiF in 1 liter of anhydrous, freshly distilled acetonitrile while cooling to 0° C. and stirring vigorously.

After approximately 125 g. of $PF_5$ had been absorbed the gas introduction was terminated and the slurry was warmed to 60 to 70° C., filtered and cooled to 0° C. The precipitate was collected by filtration and dried in vacuum at 0 to 5° C. A total of 82 g. of $Li(CH_3CN)_4PF_6$, melting at 65 to 75° C., was obtained.

X-ray diffraction pattern was as follows:

| A.: | Intensity, percent |
|---|---|
| 8.7 | 25 |
| 6.3 | 100 |
| 5.1 | 90 |
| 4.65 | 15 |
| 4.33 | 30 |
| 4.12 | 35 |
| 4.02 | 20 |
| 3.72 | 70 |
| 3.63 | 100 |
| 3.56 | 75 |
| 3.02 | 10 |
| 2.98 | 12 |
| 2.96 | 11 |
| 2.86 | 11 |
| 2.78 | 10 |
| 2.62 | 5 |
| 2.54 | 5 |
| 2.48 | 5 |

EXAMPLE II

Stability test of $Li(CH_3CN)_4PF_6$ in acetonitrile

A solution of 80.0 g. of $Li(CH_3CN)_4PF_6$ in 100 ml. anhydrous acetonitrile (freshly distilled from calcium hydride) was heated to 80° C. for three hours while excluding moisture by a stream of dry nitrogen. After cooling to ambient temperature and storage overnight, the precipitated crystals were removed by filtration. Concentration of the filtrate to 30 ml. and cooling to 0° C. produced a second crop of crystals. The combined precipitates were dried in vacuum at 0° yielding 73.5 g. of $Li(CH_3CN)_4PF_6$ (92% recovery).

EXAMPLE III

Propionitrile as solvent for $LiPF_6$

Lithium hexafluorophosphate (20.0 g.), prepared from lithium fluoride and phosphorus pentafluoride, was dissolved in 100 ml. dry propionitrile at 55° C. The solution was stored at ambient temperature for several days and was then slowly concentrated in partial vacuum. No precipitate formed. An oil separated on cooling to 0° C. which resisted all attempts to induce crystallization by customary methods.

EXAMPLE IV $Li(CH_3CN)_4PF_6$ as polymerization catalyst

An anhydrous solution of 50.0 g. of trioxane (freshly distilled) in 50.0 g. of acetonitrile was warmed to 70° C. while excluding moisture by a stream of dry nitrogen. To the stirred solution was added 0.5 g. of $Li(CH_3CN)_4PF_6$ dissolved in 5 ml. anhydrous acetonitrile. The polymerization of trioxane began within minutes as indicated by precipitation of insoluble material. After three hours the mixture was cooled to room temperature, filtered and the insoluble portion was washed several times with acetone and then with water. Drying in vacuum at 50° C. yielded 30.5 g. polyoxymethylene polymer (61%).

EXAMPLE V

The preparation of lithium hexafluorophosphate

A 2-liter stirred autoclave was charged with 82.0 g. lithium fluoride, evacuated and cooled to —78° C. One liter of anhydrous hydrogen fluoride was condensed into the reactor and the mixture was warmed to 25° C. while stirring. After one hour the autoclave was pressurized with phosphorus pentafluoride until a constant pressure of 50 p.s.i. was reached. Excess phosphorus pentafluoride and the solvent was removed the following day by condensation into an evacuated cylinder cooled with liquid nitrogen. The autoclave contained 383 g. of crude lithium hexafluorophosphate (92.1% $LiPF_6$).

Another possibility is to react LiF with $PF_5$ in the absence of HF, but the reaction takes longer and the product is even more impure. It can, however, be reacted with $CH_3CN$ to prepare the $Li(CH_3CN)_4PF_6$.

Crude lithium hexafluorophosphate (620 g.) prepared as above was added to one liter of anhydrous acetonitrile while stirring. The temperature of the slurry rose to 55° C., and was further increased to 70° C. by external heating. Insoluble material was removed by filtration. The brown solution was decolorized by activated carbon. On cooling to room temperature, large colorless needles precipitated and were collected. A second crop was obtained by cooling the filtrate to —10° C.

Drying of the combined precipitates in vacuum at 0 to 5° C. produced 1130 g. of $Li(CH_3CN)_4PF_6$. The compound melted at 65 to 75° C. Complete removal of the acetonitrile was achieved by warming to 30° C. in an evacuated system with an attached cold trap maintained at —78° C. Yield: 551 g. of 99.7% $LiPF_6$.

EXAMPLE VI

The preparation of $LiAsF_6$

Aqueous 65% hexafluoroarsenic acid (160 ml.) was added to a saturated solution of lithium hydroxide (500 ml.) while stirring rapidly. The resulting slurry was filtered hot and the filtrate evaporated to dryness under partial vacuum. The remaining crude $LiAsF_6$ (150 g.) was used for the preparation of $Li(CH_3CN)_4AsF_6$ as outlined below.

EXAMPLE VII

The preparation of $Li(CH_3CN)_4AsF_6$

Crude $LiAsF_6$ (150.0 g.) was added to anhydrous acetonitrile (400 ml.) while stirring. The exothermic interaction increased the temperature to 50° C. The solution was then filtered hot and the product precipitated by cooling.

Filtration and drying under partial vacuum produced crystalline Li(CH$_3$CN)$_4$AsF$_6$ (240.5 g.). The compound exhibited the following X-ray diffraction pattern.

| A.: | Intensity, percent |
|---|---|
| 8.70 | 40 |
| 6.30 | 65 |
| 5.68 | 2 |
| 5.12 | 100 |
| 4.63 | 3 |
| 4.38 | 14 |
| 4.13 | 5 |
| 4.06 | 6 |
| 3.72 | 11 |
| 3.64 | 38 |
| 3.59 | 80 |
| 3.35 | 18 |
| 3.15 | 6 |
| 3.00 | 5 |
| 2.96 | 2 |
| 2.86 | 2 |
| 2.80 | 3 |
| 2.56 | 6 |
| 2.14 | 3 |
| 2.09 | 7 |
| 1.873 | 3 |
| 1.845 | 3 |

It is to be understood that the foregoing working examples are given for the purpose of illustration and that any other processes, order of addition, temperature or the like set forth above may be used, provided that the teachings of this disclosure are followed.

Various modifications can be made in the process of the present invention without departing from the spirit or scope thereof for it is understood that we limit ourselves only as defined in the appended claims.

I claim:

1. The hexafluoroarsenate salt of tetraacetonitrilolithium.

2. A process for preparing the hexafluoroarsenate salt of tetraacetonitrilolithium comprising reacting a stoichiometric excess of acetonitrile with the hexafluoroarsenate salt of lithium at a temperature of from about −40° C. to about 80° C.

3. The process of claim 2 wherein said stoichiometric excess of acetonitrile and said hexafluoroarsenate salt of lithium are reacted at a temperature of from about 0° C. to about 80° C.

4. The process of claim 2 wherein said hexafluoroarsenate salt of lithium contains at least 5 weight percent impurities.

5. The process of claim 3 wherein the hexafluoroarsenate salt of tetraacetonitrilolithium is separated from impurities and then cooled to below about 0° C. under partial vacuum to remove excess acetonitrile.

References Cited

UNITED STATES PATENTS

| 3,132,166 | 5/1964 | Harrison | 260—440 |
| 3,485,860 | 12/1969 | Klingsberg | 260—440 |
| 3,542,827 | 11/1970 | Wang et al. | 260—440 |

JOSEPH P. BRUST, Primary Examiner

U.S. Cl. X.R.

23—367, 368; 260—465.8